United States Patent
Morovic et al.

(10) Patent No.: US 10,528,296 B2
(45) Date of Patent: Jan. 7, 2020

(54) INK-CHANNEL TO NPAC MAPPING

(71) Applicant: Hewlett-Packard Development Company, L.P., Houston, TX (US)

(72) Inventors: Jan Morovic, London (GB); Peter Morovic, Sant Cugat del Valles (ES); Jay S Gondek, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/073,408

(22) PCT Filed: Apr. 22, 2016

(86) PCT No.: PCT/US2016/028886
§ 371 (c)(1),
(2) Date: Jul. 27, 2018

(87) PCT Pub. No.: WO2017/184167
PCT Pub. Date: Oct. 26, 2017

(65) Prior Publication Data
US 2019/0042165 A1    Feb. 7, 2019

(51) Int. Cl.
*H04N 1/00*    (2006.01)
*G06F 3/12*    (2006.01)
*G06K 15/02*    (2006.01)

(52) U.S. Cl.
CPC .......... *G06F 3/1206* (2013.01); *G06F 3/1296* (2013.01); *G06K 15/1809* (2013.01); *G06K 15/1878* (2013.01); *G06K 15/1881* (2013.01)

(58) Field of Classification Search
CPC . G06F 3/1206; G06F 3/1296; G06K 15/1878; G06K 15/1809; G06K 15/1881; H04N 1/60; H04N 1/52
USPC ........................................................ 358/3.06
See application file for complete search history.

(56) References Cited

U.S. PATENT DOCUMENTS

| 8,616,126 B2 | 12/2013 | Byrne et al. |
| 8,824,005 B2 | 9/2014 | Edge |
| 8,861,053 B2 | 10/2014 | Nudurumati et al. |
| 2010/0214576 A1 | 8/2010 | Morovic et al. |

(Continued)

FOREIGN PATENT DOCUMENTS

| CN | 104354475 | 2/2015 |
| WO | WO-2016028272 | 2/2016 |

OTHER PUBLICATIONS

Praefcke, W. et al., Quality Limits in Color Printing with More Than Three Primary Colors, Sep. 8-11, 1998.

*Primary Examiner* — Saeid Ebrahimi Dehkordy
(74) *Attorney, Agent, or Firm* — Tarolli Sundheim Covell & Tummino LLP (57) ABSTRACT

A system includes a memory to store ink-channel data that describe print resources for an ink-channel printing pipeline and Neugebauer Primary area coverage (NPac) data of an alternative printing pipeline. An NPac property stored in the memory describes a dimensional relationship between the NPac data of the alternative printing pipeline and the ink-channel data for the ink-channel printing pipeline. The system includes a processor to execute instructions stored in the memory. The instructions generate a mapping file based on the NPac property to map from an ink-channel space described by the ink-channel data to an NPac space described by the NPac data.

20 Claims, 5 Drawing Sheets

(56) References Cited

U.S. PATENT DOCUMENTS

| | | |
|---|---|---|
| 2011/0096344 A1 | 4/2011 | Morovic et al. |
| 2011/0096365 A1* | 4/2011 | Benedicto ............ H04N 1/6033 358/3.06 |
| 2011/0187771 A1 | 8/2011 | Helterline et al. |
| 2016/0080608 A1 | 3/2016 | Morovic et al. |

* cited by examiner

INK-CHANNEL TO NPAC MAPPING

BACKGROUND

Color printing may result from a number of colorants of different colors being superimposed on top of a substrate, such as paper or other media. Since some printing technologies only allow for a very small number of levels of inks to be deposited at a given location on a substrate, half-toning may be used to obtain ink patterns that result in a given color when seen from a suitable viewing distance. These halftone patterns may also result in colorants being deposited on top of or next to one another in a specific manner, providing a color that relates nonlinearly to the amounts of the colorants (e.g., inks) used. Color control for the respective colorants may be increased due to Neugebauer's model of halftone color reproduction. Neugebauer's model may provide that the color of a halftone pattern is the convex combination of the colors of the Neugebauer primaries (NPs) used in the pattern. Thus, an NP is one of the possible ink overprints, with its convex weight being the relative area covered by it.

DETAILED DESCRIPTION

This disclosure relates to mapping between print resources described in an ink-channel domain to print resources described in a Neugebauer Primary area coverage (NPac) domain. The NPac domain can relate to a Halftone Area Neugebauer Separation (HANS) pipeline, for example. The HANS imaging pipeline may offer benefits on the halftoning side (e.g., allowing for full plane-dependence control, a blending of multiple halftoning techniques, and so forth) and in terms of flexibility where multiple imaging pipeline resources can be blended. However, in some cases, it may be beneficial to be able to directly use resources developed for conventional ink-channel-based imaging pipelines in the HANS pipeline or to print content already processed for such imaging pipelines.

A mapping file is generated that allows printing processes to integrate ink-channel content into HANS-native Neugebauer Primary (NP) area coverage pipelines. The integration may be automated and may involve no prior knowledge of ink-channel pipelines. This may allow for a leveraging of a host of HANS benefits including hardware assistance developed for HANS (e.g., FPGA, GPU, ASIC) and auxiliary HANS functionality (e.g., calibration, print dynamics) providing flexibility and new workflow options.

Higher-dimensional NPac data for using a HANS pipeline can be analytically synthesized via logic circuits (e.g., processor circuits, memory circuits, and so forth) from lower-dimensional ink-channel data. To bridge the dimensionality gap, a selection of NPac properties (e.g., heuristics or rules) allow for the generation of $k^n$ dimensional NPac data (where k is the number of ink levels per ink per halftone pixel—e.g., 2 for a binary system—and n is the number of inks) from n dimensional ink channel data. Having the ability to dynamically map vectors from an ink space to vectors in an NPac space allows for ink channel inputs to then be processed using the same (e.g., logic and hardware) infrastructure as used for the HANS pipeline.

Figure 1:
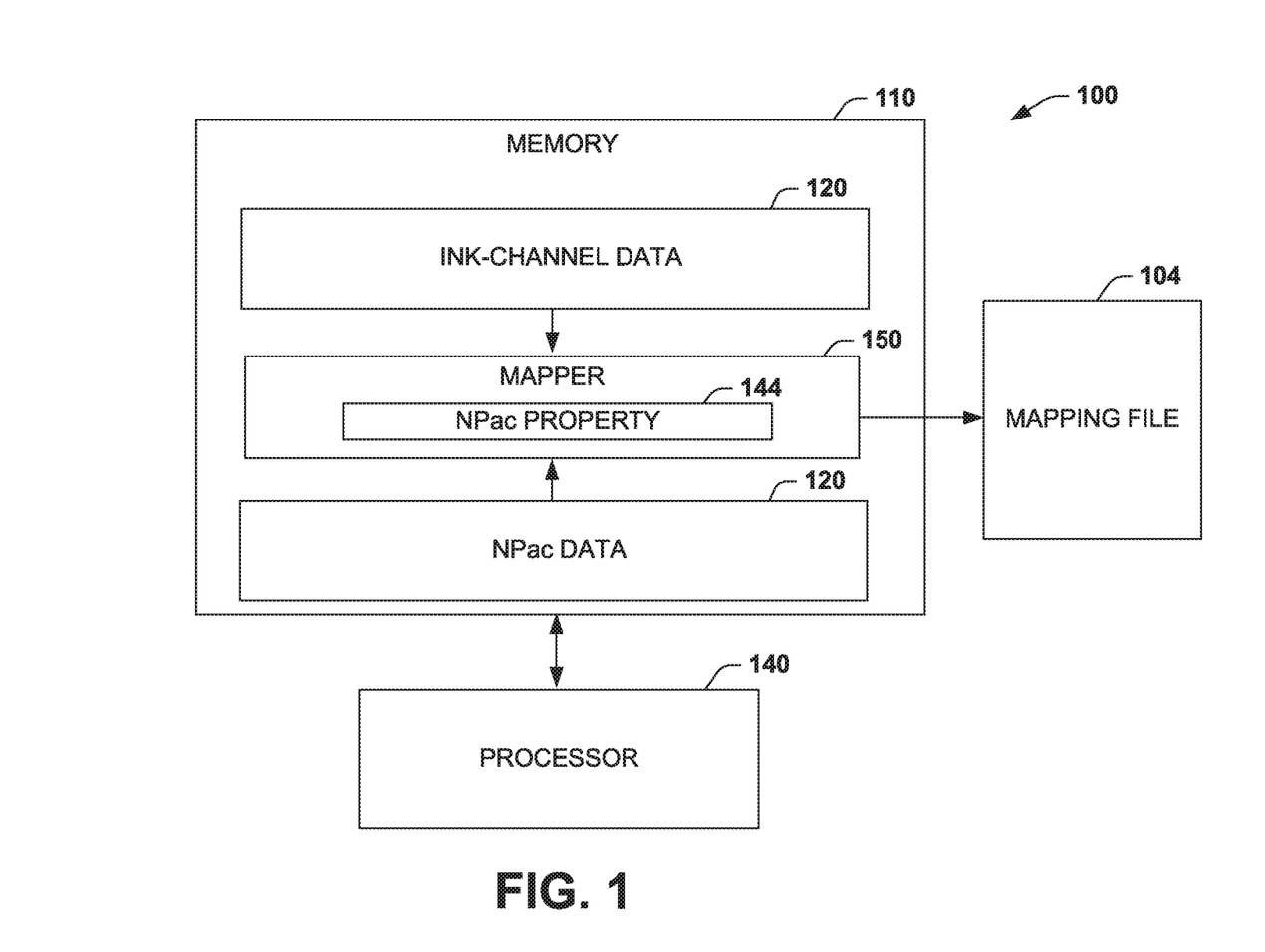
FIG. 1 illustrates an example of a system that generates a mapping file to enable printing resources described for an ink-channel domain to be utilized by an alternative printing domain.

FIG. 1 illustrates an example of a system 100 that generates a mapping file 104 to enable printing resources described for an ink-channel domain to be utilized by an alternative printing domain. As used herein the term alternative printing pipeline refers to a printing pipeline that employs area coverage models that cover a wider range of color combinations than can be specified by the more narrow drop-weight categories of the ink-channel domain. An example of an alternative printing pipeline is the HANS pipeline described herein. As used herein, the term ink refers to any type of colorant. Colorants as described herein can include materials such as glues, synthetics, toners, waxes, dyes, and so forth each having any color or color combination to produce a pattern on the substrate. For example, printers as described herein can employ different combinations of colorants, which can vary according to the color model implemented by the printer (e.g., Cyan, Magenta, Yellow and Black in a CMYK color model; Red, Green and Blue in an RGB color model or other color combinations).

The system 100 includes a memory 110 (e.g., memory or register circuit of CMOS transistor devices) to store ink-channel data 120 that describe print resources for an ink-channel printing pipeline and Neugebauer Primary area coverage (NPac) data 130 of an alternative printing pipeline. The ink-channel data 120 and the NPac data 130 can be received via files over a network connection, for example (See e.g., FIG. 4). A processor 140 (e.g., processor circuit, application specific integrated circuit ASIC) executes instructions (e.g., logic configured in memory, gate array, or registers) from the memory 110. The processor 140 can be a central processing unit (CPU), field programmable gate array (FPGA), ASIC, or a set of logic circuits that can be defined via a hardware description language such as VHDL. The instructions can be executed out of firmware, random access memory, and/or executed as configured logic circuits such as via registers, flip/flops, and/or state machines configured in a gate array, for example.

The memory 110 includes an NPac property 144 that describes a dimensional relationship between the NPac data 130 of the alternative printing pipeline and the ink-channel data 120 for the ink-channel printing pipeline. The NPac property 144 can relate to rules, heuristics, or equations that allow lower-dimensional ink-channel specifications to derive higher-dimensionality control vectors for the alternative printing pipeline. This may enable instructions for one printing system to be automatically analyzed and utilized to derive instructions for a higher-order printing system. The instructions can perform a method that includes a generating the mapping file 104 based on the NPac property 144 to map from an ink-channel space described by the ink-channel data 120 to an NPac space described by the NPac data 130. This enables the print resources for the ink channel printing pipeline to be utilized by the alternative printing pipeline without operator assistance or intervention to account for the differences between the pipelines.

Figure 2:
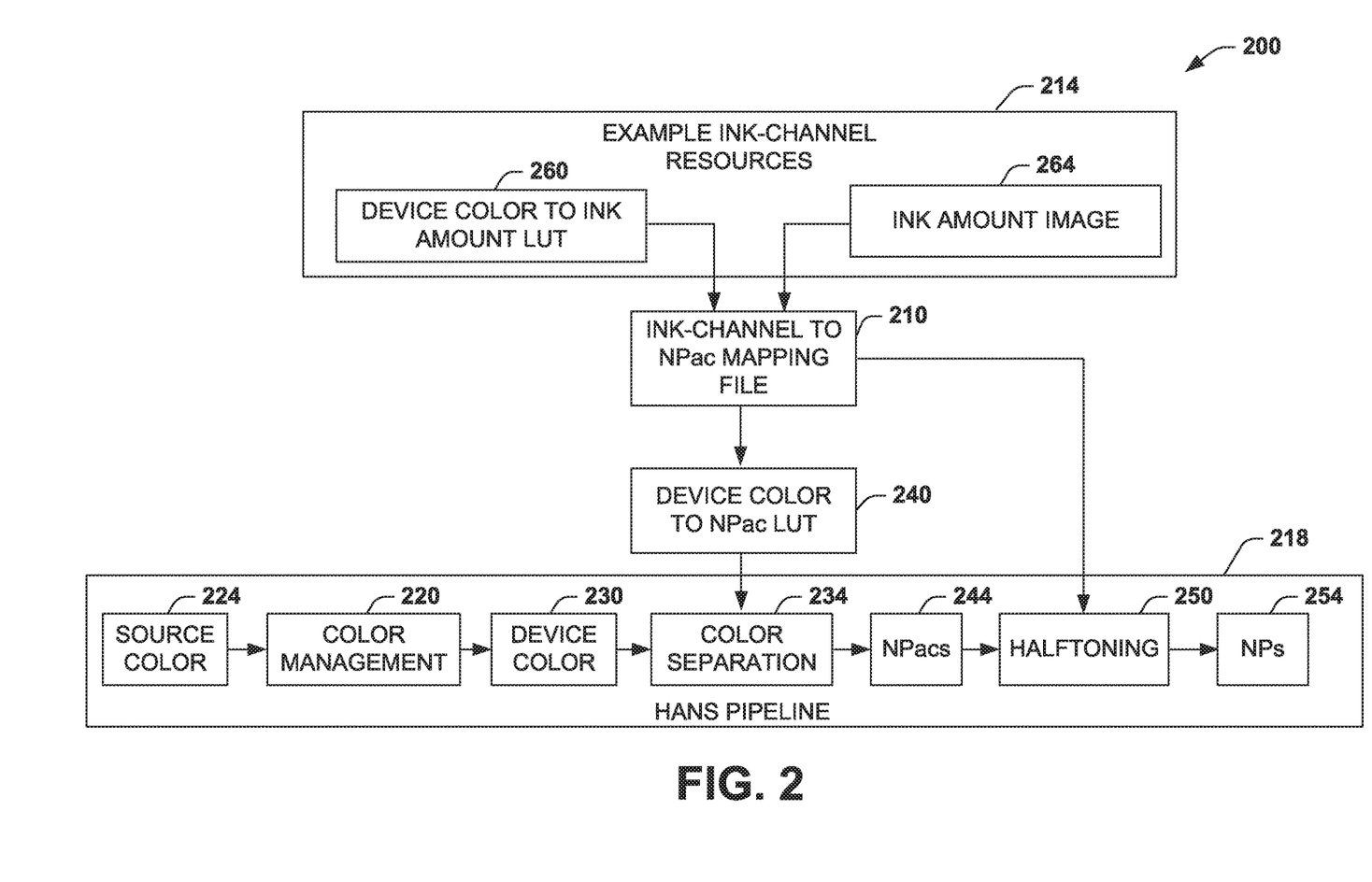
FIG. 2 illustrates an example of a printing pipeline that utilizes a mapping file to utilize ink-channel print resources in a Halftone Area Neugebauer Separation (HANS) pipeline.

In one example, the alternative printing pipeline is a Halftone Area Neugebauer Separation (HANS) printing pipeline (See e.g., FIG. 2). The HANS pipeline may be executed by the processor 140, or in other implementations, the HANS may be executed using a printing system (e.g., via printer controller). The HANS pipeline changes the space in which a color separation process and a halftoning process communicate. In one example of a separation performed using HANS, the channels connecting the color separation process and the halftoning process communicate using aspects associated with the NPac data 130. In one implementation, the NPacs utilize a set of equations referred to as the Neugebauer equations. In at least one example, Neugebauer equations are tools for characterizing color printing systems based upon halftoning techniques. The Neugebauer equations, can be associated with colors referred to as the Neugebauer Primaries, which in a binary (bi-level) printing device, are the $2^n$ combination of n colorants (e.g., inks) and their overprints, wherein the application of each of the n colorants is at either 0% or 100%. Generally, the number of Neugebauer Primaries (NPs) is $k^n$, where k is the number of levels at which an ink can be used and n is the number of colorants. For example, for a printer comprising six different inks and either 0, 1, or 2 drops of each ink may be specified at each halftone pixel, resulting in 36 or 729 Neugebauer Primaries (NPs).

In this example, the NPac property 144 accounts for and describes $k^n$ dimensional NPac data 130, where k is an integer describing the number of ink levels per ink per halftone pixel, and n is an integer describing a number of inks. The mapping file 104 includes vectors that describe a vector mapping between the ink-channel space and the NPac space to enable the print resources for the ink channel printing pipeline to be utilized by the alternative printing pipeline (e.g., HANS). The vector mapping can be applied to a device color to NPac look-up table (LUT) or a halftoning segment of the HANS pipeline (See e.g., FIG. 2). The mapping file 104 can include vectors that map print resources from the ink-channel space to the NPac space. The print resources include at least one of a device color to ink amount look-up table (LUT) or an ink amount image. Other print resources can include ink-channel images, print job files, and/or other printing files.

In one example, the mapper 150 utilizes a minimization rule (or heuristic) to minimize ink overprinting via NPacs derived from ink-channel space that includes a blank substrate, a number of inks, and a specification of the amount of overprinting between the number of inks given ink amounts expressed in relative terms having a range between 0 and 1, for example. In another example, the mapper 150 utilizes a maximization rule to maximize ink overprinting via NPacs derived from ink-channel space that includes an index of smaller ink amounts for a number of inks from ink-channel space and an index of larger ink amounts for a number of inks from ink-channel space. In yet another example, the mapper 150 utilizes a Demichel equation (or equations) to generate NPac vectors from ink-channel space when the inks in the ink-channel space are distributed randomly over a unit area. Such mapping examples are described below with respect to FIGS. 3 and 4.

FIG. 2 illustrates an example of a printing pipeline that utilizes a mapping file 210 to utilize ink-channel print resources 214 in a Halftone Area Neugebauer Separation (HANS) pipeline 218. The HANS pipeline 218 includes a color management segment 220 (e.g., color manager logic operated by a processor) that receives source color data 224 and generates a device color output 230 (e.g., specification of red, green, and blue). The device color output 230 can be processed by a color separation segment 234 that receives input from a device color (DC) to NPac look-up table (LUT) 240. Generally, one Neugebauer Primary area coverage (NPac) is generated for each node of the LUT 240 in response to a device color input value that corresponds to each node. Each LUT 240 can be indexed via Device Color (DC) values (e.g., RGB) and contains one NPac per node. For example, for a regular, 3^3 LUT, there are 27 nodes in the LUT, each corresponding to device color ranges such as RGB values that can have all combinations of [e.g., 0%, 50%, 100%] value and where at each of the 27 nodes of that LUT there is one corresponding Npac. Output from the color separation segment 234 is a plurality of NPacs 244 which are processed via a halftoning segment 250 which generates a plurality of NPs 254 which describes ink amounts that are the $2^n$ combination of n colorants (e.g., inks) and their overprints, wherein the application of each of the n colorants is at either 0% or 100%, for example.

Example print resources are shown at 214. These can be from conventional ink-channel specifications and can include images, colorant specifications, colorant amounts, halftoning instructions, color separation instructions and so forth. In this example, the ink-channel resources 214 include a device color to ink channel look-up table (LUT) 260 and/or an ink amount image 264, for example. The mapping file 210 provides an ink-channel to NPac mapping to map resources 214 specified for ink-channel space such that the resources (e.g., print jobs) can be executed by the HANS pipeline 218. The mapping file 210 can include vectors having a magnitude and direction to provide instructions to the HANS pipeline 218. Some of the vectors can be applied to adjust the nodes of the DC to NPac LUT 240 and/or can also be generated to control the halftoning segment 250 of the HANS pipeline 218. As will be described below with respect to FIGS. 3 and 4, ink-channel resources can be specified as inks i1, i2, . . . in which are subsequently mapped in the mapping file 210 as vectors I1, I2, . . . IN to the respective NPac domain which is then utilized to control the HANS pipeline 218.

Figure 3:
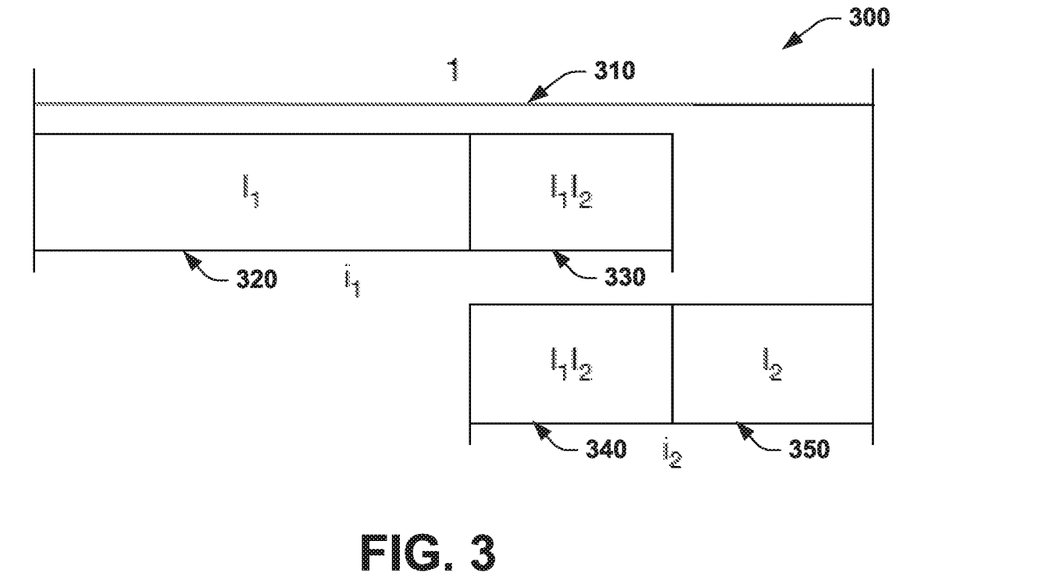
FIG. 3 illustrates an example diagram depicting a mapping utilizing an ink minimization overprinting rule.

FIG. 3 illustrates an example diagram 300 depicting a mapping utilizing an ink minimization overprinting rule. In the following examples, two-ink mapping examples are provided for purposes of explanation; however, a plurality of such inks and vectors can similarly be analyzed, processed, and mapped according to the rules, heuristics, and/or equations described herein. The diagram 300 shows a segment 310 describing 100 percent coverage of a given area of a substrate. In this example, ink-channel data i1 is mapped to correspond with vector segment I1 at 320. The data i1 also contributes to the mapping of an overlap segment 330 of from inks i1 and i2 consisting of vectors I1 and I2. With respect to ink i2, an overlap segment is shown at 340 with coincides with segment 330, where segment 340 includes the contribution of i2 alone and is mapped as vector I2. The following describes an example rule for mapping between inks i1 and i2 to vectors I2 and I2 for the respective segments 320 through 350.

Since the mapping from ink to NPac space is underdetermined, there are a variety of process flows in which mapping can be achieved, such as with the addition of constraints, rules, desired properties, and so forth. One example rule to follow to perform mapping as described herein is to either maximize (See e.g., FIG. 4) or minimize ink overprinting such as with the example of FIG. 3. In one example, for a straight-forward, binary two-ink system, the following rules can be used to generate [W,I1,I2,I1I2] NPacs, where the NPacs specify area coverages for the example system's four NPs described by blank substrate— W, inks 1 and 2 by themselves and the overprint of the two inks) that minimize ink overprinting, given ink amounts i1 and i2 (expressed in relative terms with values in a [0,1] range). The following describes example pseudo code or logic to generate the respective mapping for this example.

% if the sum of ink amounts does not exceed 100%, use them directly as area coverages follows:

If $(i1+i2)<=1.0$;

$W=(1-i1-i2)$;

$I1=i1$;

$I2=i2$;

$I1I2=0$;

% else, compute the smallest amount of overprint needed to not exceed 100% coverage and match ink amounts, by solving the following linear equations (more equations when more than two inks involved):

$I1+I1I2=i1$;

$I2+I1I2=i2$;

$I1+I2+I1I2=1$;

else $W=0$;

$I1=1-i2$;

$I2=1-i1$;

$I1I2=i1+i2-1$.

Figure 4:
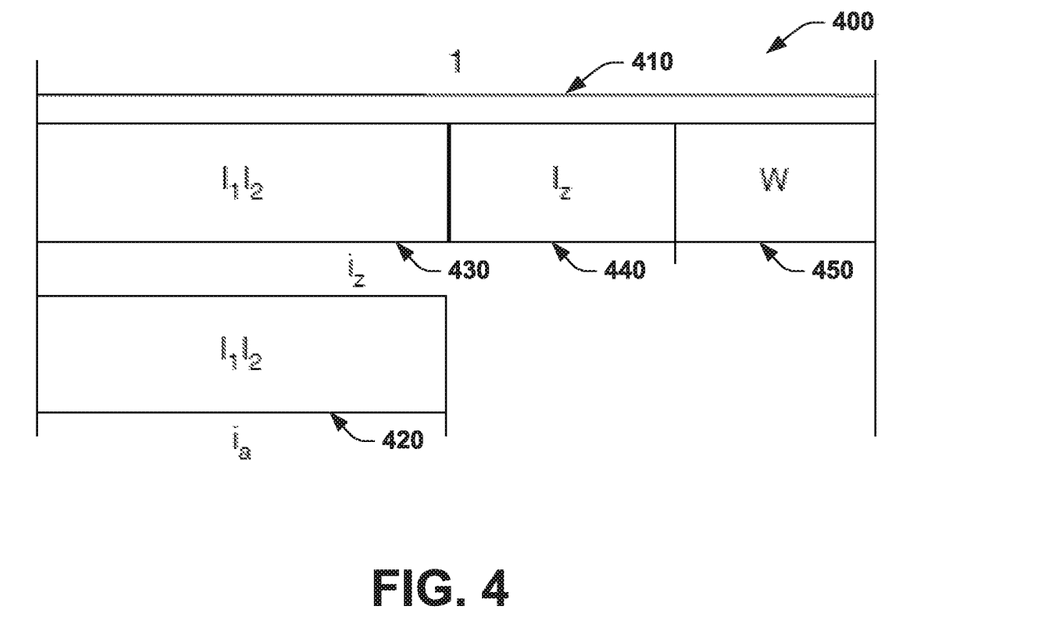
FIG. 4 illustrates an example diagram depicting a mapping utilizing an ink maximization overprinting rule.

FIG. 4 illustrates an example diagram 400 depicting a mapping utilizing an ink maximization overprinting rule. The diagram 400 shows a segment 410 describing 100 percent coverage of a given area of a substrate. In this example, ink-channel data is specified in terms of indexes ia and iz. The index ia covers an overlap region 420 that includes I1 and I2. The index iz covers an overlap region of I2 and I2 at 430, a region Iz at 440, and a blank substrate region W at 450. The following describes an example rule for mapping between ia and iz to vectors I2 and I2 for the respective segments 420 through 450.

Conversely, maximizing overprinting could be achieved in the following way, where a is the index of the ink with the smaller ink amount and z the index of the ink with the larger amount (i.e., if the first ink has a smaller amount, then a=1 and z=2). Note that if the amounts are the same then the assignment of a and z does not matter:

$I1I2=ia$;

$Ia=0$;

$Iz=iz-ia$;

$W=1-I1I2-I1-I2$.

In another example, Demichel equations, which describe the area coverages of NPs for a set of inks, may be employed when those inks are distributed randomly over a unit area, and the equations may be used prescriptively (e.g., instead of as a model of what would happen under random distribution, use it as a mapping):

$W=(1-i1)(1-i2)$;

$I1=i1(1-i2)$;

$I2=i2(1-i1)$;

$I1I2=i1i2$.

Other rules can be devised to obtain predetermined relationships between ink/colorant amounts and the area coverages of NPs that can be constructed from them. It is noted that the above considerations can apply to 3D printing where agent-channels can be mapped to M-vectors use using the above described examples of minimizing and/or maximizing combining the agents or using Demichel equations (as examples).

Figure 5:
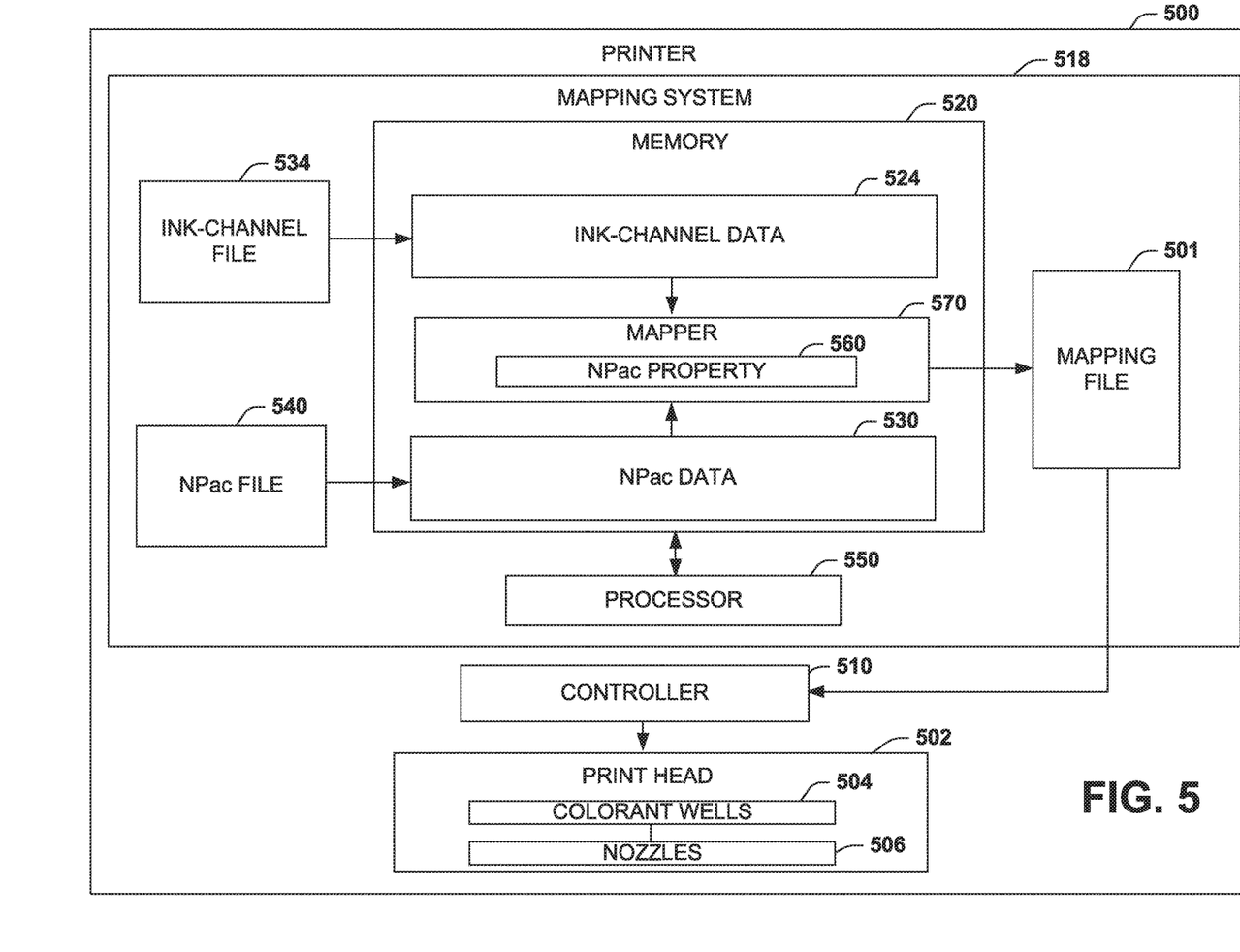
FIG. 5 illustrates an example of a printer that utilizes a mapping file to enable printing resources described for an ink-channel domain to be utilized by an alternative printing domain.

FIG. 5 illustrates an example of a printer 500 that utilizes a mapping file 501 to enable printing resources described for an ink-channel domain to be utilized by an alternative printing domain. The printer 500 includes a print head 502 having a plurality of wells 504 (e.g., ink wells or channels) to disperse colors on a substrate (e.g., paper, plastic, and so forth) via a plurality of nozzles 506. The printer 500 includes a controller 510 to issue commands to the print head 502 to control the amount of colorant dispersed on the substrate. The mapping system 518 provides the mapping file 501 to the controller 510 to control the amount of colorant dispersed on the substrate in accordance with an alternative printing pipeline as described herein (e.g., HANS pipeline). The mapping system 518 includes a memory 520 to store ink-channel data 524 that describes print resources for an ink-channel printing pipeline and Neugebauer Primary area coverage (NPac) data 530 of a Halftone Area Neugebauer Separation (HANS) printing pipeline. The data 524 and 530 can be received via files 534 and 540 respectively which can be received from a network connection or locally via a CD-ROM input for example. A processor 550 executes instructions (or logic) from the memory 518.

The instructions include an NPac property 560 that describes a dimensional relationship between the NPac data 530 of the HANS printing pipeline and the ink-channel data 524 for the ink-channel printing pipeline. A mapper 570 generates the mapping file 501 based on the NPac property 560 to map from an ink-channel space described by the ink-channel data 524 to an NPac space described by the NPac data 530 to enable the print resources for the ink channel printing pipeline to be utilized by the HANS printing pipeline. In another example, the mapper 570 may not be included where either the processor and/or controller are configured to interpret the mapping file which is generated by another system (e.g., remote system not shown).

The mapping file 510 can include vectors that describe a vector mapping between the ink-channel space and the NPac space to enable the print resources for the ink channel printing pipeline to be utilized by the HANS printing pipeline. The vector mapping can be applied to a device color to NPac look-up table (LUT) or a halftoning segment of the HANS pipeline (See e.g., FIG. 2). The mapping file 501 can include vectors that map print resources from the ink-channel space to the NPac space where the print resources include at least one of a device color to ink amount look-up table (LUT) or an ink amount image, for example (See e.g., FIG. 2).

Figure 6:
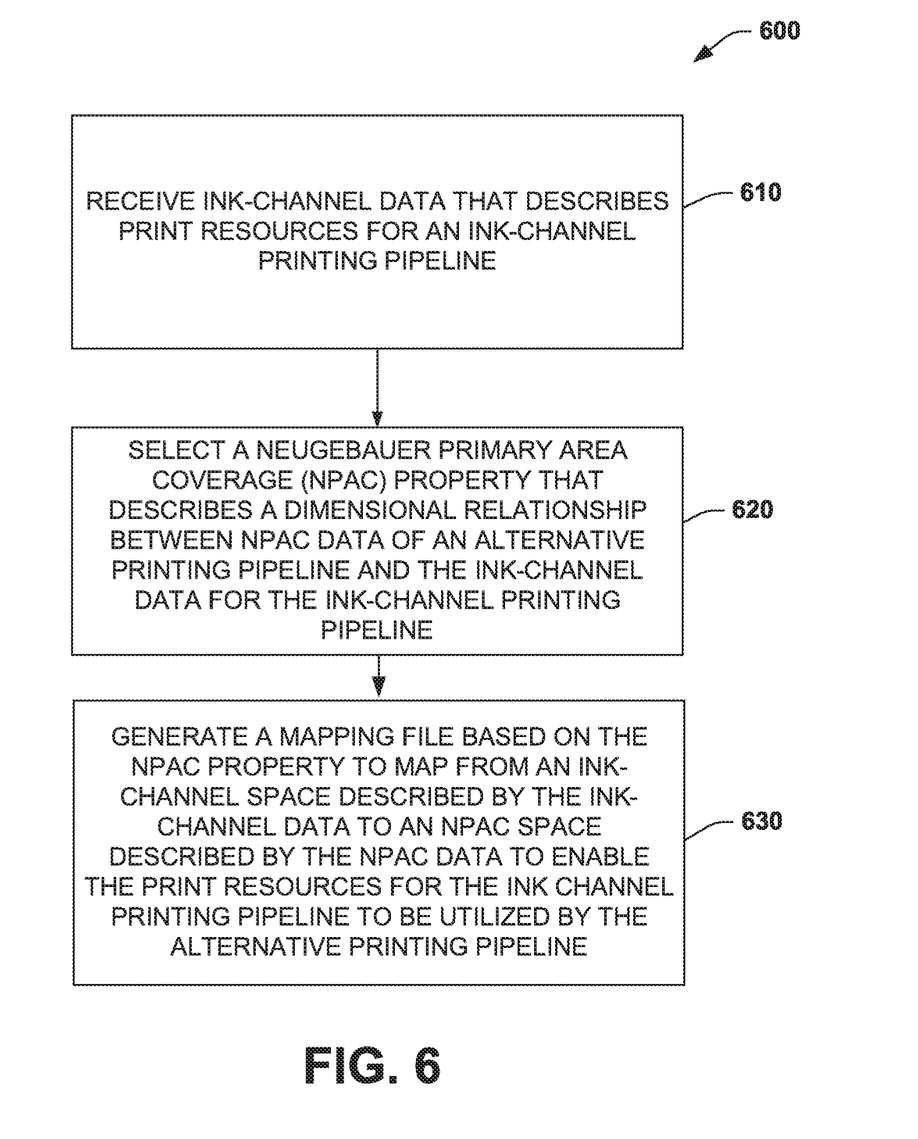
FIG. 6 illustrates an example of a method that that generates a mapping file to enable printing resources described for an ink-channel domain to be utilized by an alternative printing domain.

In view of the foregoing structural and functional features described above, an example method will be better appreciated with reference to FIG. 6. While, for purposes of simplicity of explanation, the method is shown and described as executing serially, it is to be understood and appreciated that the method is not limited by the illustrated order, as parts of the method could occur in different orders and/or concurrently from that shown and described herein. Such method can be executed by various components and executed by an integrated circuit, computer, or a controller, for example.

FIG. 6 illustrates an example of a method 600 that that generates a mapping file to enable printing resources described for an ink-channel domain to be utilized by an alternative printing domain. At 610, the method 600 includes receiving ink-channel data that describes print resources for an ink-channel printing pipeline (e.g., via memory 510 and processor 550 of FIG. 5). At 620, the method 600 includes selecting a Neugebauer Primary area coverage (NPac) property that describes a dimensional relationship between NPac data of an alternative printing pipeline and the ink-channel data for the ink-channel printing pipeline (e.g., via NPac property 560 and mapper 570 of FIG. 5). At 630, the method 600 includes generating a mapping file based on the NPac property to map from an ink-channel space described by the ink-channel data to an NPac space described by the NPac data (e.g., via NPac property 560 and mapper 570 of FIG. 5). This enables print resources for the ink channel printing pipeline to be utilized by the alternative printing pipeline. In one example, the alternative printing pipeline is a Halftone Area Neugebauer Separation (HANS) printing pipeline.

What have been described above are examples. It is, of course, not possible to describe every conceivable combination of components or methods, but one of ordinary skill in the art will recognize that many further combinations and permutations are possible. Accordingly, this application is intended to embrace all such alterations, modifications, and variations that fall within the scope of this application, including the appended claims. Additionally, where the disclosure or claims recite "a," "an," "a first," or "another" element, or the equivalent thereof, it should be interpreted to include one or more than one such element, neither requiring nor excluding two or more such elements. As used herein, the term "includes" means includes but not limited to, and the term "including" means including but not limited to. The term "based on" means based at least in part on.

What is claimed is:

1. A system, comprising:
a memory to store ink-channel data that describe print resources for an ink-channel printing pipeline and Neugebauer Primary area coverage (NPac) data of an alternative printing pipeline;
an NPac property stored in the memory that describes a dimensional relationship between the NPac data of the alternative printing pipeline and the ink-channel data for the ink-channel printing pipeline; and
a processor to execute instructions stored in the memory, the instructions to:
generate a mapping file based on the NPac property to map from an ink-channel space described by the ink-channel data to an NPac space described by the NPac data to enable the print resources for the ink-channel printing pipeline to be utilized by the alternative printing pipeline.

2. The system of claim 1, wherein the alternative printing pipeline is a Halftone Area Neugebauer Separation (HANS) printing pipeline.

3. The system of claim 1, wherein the processor is to receive the ink-channel data or the NPac data from a file communicated via a network connection.

4. The system of claim 1, wherein the NPac property describes a $k^n$ dimensional NPac data, where k is an integer describing a number of ink levels per ink per halftone pixel, and n is an integer describing a number of inks.

5. The system of claim 1, wherein the mapping file includes vectors that describe a vector mapping between the ink-channel space and the NPac space to enable the print resources for the ink-channel printing pipeline to be utilized by the alternative printing pipeline.

6. The system of claim 5, wherein the processor is to apply the vector mapping to a device color to NPac look-up table (LUT) or a halftoning segment of the HANS pipeline.

7. The system of claim 5, wherein the mapping file includes vectors that map the print resources for the ink-channel printing pipeline to the NPac space, the print resources including at least one of a device color to ink amount look-up table (LUT) or an ink amount image.

8. The system of claim 1, wherein the instructions are executable on the processor to apply a minimization rule to minimize ink overprinting via NPacs derived from the ink-channel space that includes a blank substrate, a number of inks, and a specification of an amount of overprinting between a number of inks given ink amounts expressed in relative terms having a range between 0 and 1.

9. The system of claim 1, wherein the instructions are executable on the processor to apply a maximization rule to maximize ink overprinting via NPacs derived from the ink-channel space that includes an index of smaller ink amounts for a number of inks from the ink-channel space, and an index of larger ink amounts for a number of inks from the ink-channel space.

10. The system of claim 1, wherein the instructions are executable on the processor to apply a Demichel equation to generate NPac vectors from the ink-channel space when inks in the ink-channel space are distributed randomly over a unit area.

11. A printer, comprising:
a print head having a plurality of wells to disperse colors on a substrate;
a controller to issue drop weight commands to the print head to control an amount of colorant dispersed on the substrate; and
a mapping system to provide a mapping file to the controller to control the amount of colorant dispersed on the substrate, the mapping system comprising:
a memory to store ink-channel data that describe print resources for an ink-channel printing pipeline and Neugebauer Primary area coverage (NPac) data of a Halftone Area Neugebauer Separation (HANS) printing pipeline;
an NPac property stored in the memory that describes a dimensional relationship between the NPac data of the HANS printing pipeline and the ink-channel data for the ink-channel printing pipeline; and
a processor to execute instructions from the memory, the instructions to:
generate a mapping file based on the NPac property to map from an ink-channel space described by the ink-channel data to an NPac space described by the NPac data to enable the print resources for the ink-channel printing pipeline to be utilized by the HANS printing pipeline.

12. The printer of claim 11, wherein the mapping file includes vectors that describe a vector mapping between the ink-channel space and the NPac space to enable the print resources for the ink channel printing pipeline to be utilized by the HANS printing pipeline, and the processor is to apply the vector mapping to a device color to NPac look-up table (LUT) or a halftoning segment of the HANS printing pipeline.

13. The printer of claim 12, wherein the mapping file includes vectors that map the print resources for the ink-channel printing pipeline to the NPac space, the print resources including at least one of a device color to ink amount look-up table (LUT) or an ink amount image.

14. The printer of claim 11, wherein the instructions are executable on the processor to apply a minimization overprinting rule to minimize ink overprinting via NPacs derived from the ink-channel space.

15. The printer of claim 11, wherein the instructions are executable on the processor to apply a maximization rule to maximize ink overprinting via NPacs derived from the ink-channel space.

16. A non-transitory storage medium comprising instructions that upon execution cause a system to:
  receive ink-channel data stored in a memory that describe print resources for an ink-channel printing pipeline;
  select a Neugebauer Primary area coverage (NPac) property stored in the memory, the NPac property describing a dimensional relationship between NPac data of an alternative printing pipeline and the ink-channel data for the ink-channel printing pipeline; and
  generate a mapping file based on the NPac property to map from an ink-channel space described by the ink-channel data to an NPac space described by the NPac data to enable the print resources for the ink-channel printing pipeline to be utilized by the alternative printing pipeline.

17. The non-transitory storage medium of claim 16, wherein the alternative printing pipeline is a Halftone Area Neugebauer Separation (HANS) printing pipeline.

18. The non-transitory storage medium of claim 16, wherein the instructions upon execution cause the system to:
  apply a minimization overprinting rule related to the NPac property to minimize ink overprinting via NPacs derived from the ink-channel space.

19. The non-transitory storage medium of claim 16, wherein the instructions upon execution cause the system to:
  apply a maximization rule related to the NPac property to maximize ink overprinting via NPacs derived from the ink-channel space.

20. The non-transitory storage medium of claim 16, wherein the instructions upon execution cause the system to:
  apply a Demichel equation related to the NPac property to generate NPac vectors from the ink-channel space when inks in the ink-channel space are distributed randomly over a unit area.

* * * * *